United States Patent

Hori et al.

[11] Patent Number: 5,825,511
[45] Date of Patent: Oct. 20, 1998

[54] IMAGE PICKUP APPARATUS

[75] Inventors: Masashi Hori, Yokohama; Yuji Sakaegi, Kawasaki; Saburo Nakazato, Yokohama; Izuru Horiuchi, Machida, all of Japan

[73] Assignee: Canon Kabushiki Kaisha, Tokyo, Japan

[21] Appl. No.: 336,230

[22] Filed: Nov. 3, 1994

Related U.S. Application Data

[63] Continuation of Ser. No. 871,915, Apr. 22, 1992, abandoned.

[30] Foreign Application Priority Data

Apr. 26, 1991 [JP] Japan ................................. 3-096542
Apr. 26, 1991 [JP] Japan ................................. 3-123048

[51] Int. Cl.$^6$ .............................. H04N 1/04; H04N 1/36
[52] U.S. Cl. ......................... 358/486; 358/409; 358/412; 358/471
[58] Field of Search ................................. 358/409, 412, 358/413, 443, 471, 486

[56] References Cited

U.S. PATENT DOCUMENTS

| | | | |
|---|---|---|---|
| 5,029,227 | 7/1991 | Kawamura | 358/455 |
| 5,087,971 | 2/1992 | Sakata et al. | 358/160 |
| 5,122,885 | 6/1992 | Yoshioka et al. | 358/310 |
| 5,557,426 | 9/1996 | Sakata | 358/448 |

FOREIGN PATENT DOCUMENTS

| | | |
|---|---|---|
| 59-126376 | 7/1984 | Japan . |
| 2266659 | 10/1990 | Japan . |
| 3070277 | 3/1991 | Japan . |

*Primary Examiner*—Thomas D. Lee
*Attorney, Agent, or Firm*—Fitzpatrick, Cella, Harper & Scinto

[57] ABSTRACT

An image pickup device having a solid-state image pickup element, and a memory for storing a signal read from said solid-state image pickup element, in which there are provided first and second clock pulse generation circuits for generating the clock pulse having respective predetermined frequencies, and a switch circuit for switching the clock pulse depending on whether said solid-state image pickup element is operating or not, is characterized in that when said solid-state image pickup element is operating, the processing pulse for each portion is generated based on the clock pulse generated in either one of said first and second clock pulse generation circuits, and when said solid-state image pickup element is not operating, the processing pulse for each portion is generated based on the clock pulse generated in the other clock pulse generation circuit.

12 Claims, 5 Drawing Sheets

IMAGE PICKUP APPARATUS

This application is a continuation of application Ser. No. 07/871,915 filed Apr. 22, 1992, which is now abandoned.

BACKGROUND OF THE INVENTION

1. Field of the Invention

The present invention relates to an image pickup apparatus, and particularly to an image pickup apparatus having a solid-state image pickup element and a memory.

2. Related Background Art

Conventionally, in a video camera having a solid-state image pickup element and a memory, for example, a memory controller for controlling the memory was provided with a clock generation circuit to drive the solid-state image pickup element based on the clock of the clock generation circuit or perform the signal processing. Also, there was a video camera in which the clock pulse was independently generated in the memory controller and a timing generator for driving the solid-state image pickup element.

However, in the conventional example as above described, with the former, the clock was possibly modulated by the frequency component of the pulse generated in the memory controller, and the driving pulse for the solid-state image pickup element and the pulse for use in the signal processing were generated by the timing generator using this clock, so that the driving pulse or the signal processing pulse which was a high speed pulse inherited modulated components of the clock, and was superimposed as noise on a video signal output from the solid-state image pickup element or a video signal within the signal processing circuit. With the latter configuration, there was a problem that when the output of the solid-state image pickup element was stored in the memory, the image information contained therein was significantly lost substantially degrading the resolution of the obtained image.

SUMMARY OF THE INVENTION

The present invention has been achieved to resolve such a problem, and aims to provide an image pickup apparatus in which the noise component of the video signal is effectively suppressed.

To accomplish such an object, an embodiment of the present invention can be realized by an image pickup apparatus having a solid-state image pickup element, and a memory for storing a signal read from said solid-state image pickup element, in which there are provided first and second clock pulse generation means for generating the clock pulse having respective predetermined frequencies, and a switch means for switching the clock pulse depending on whether said solid-state image pickup element is operating or not, characterized in that when said solid-state image pickup element is operating, the processing pulse for each portion is generated based on the clock pulse generated in either one of said first and second clock pulse generation means, and when said solid-state image pickup element is not operating, the processing pulse for each portion is generated based on the clock pulse generated in the other clock pulse generation means.

DETAILED DESCRIPTION OF THE PREFERRED EMBODIMENT

The preferred embodiment of the present invention will be described below with reference to the drawings.

Figure 1:
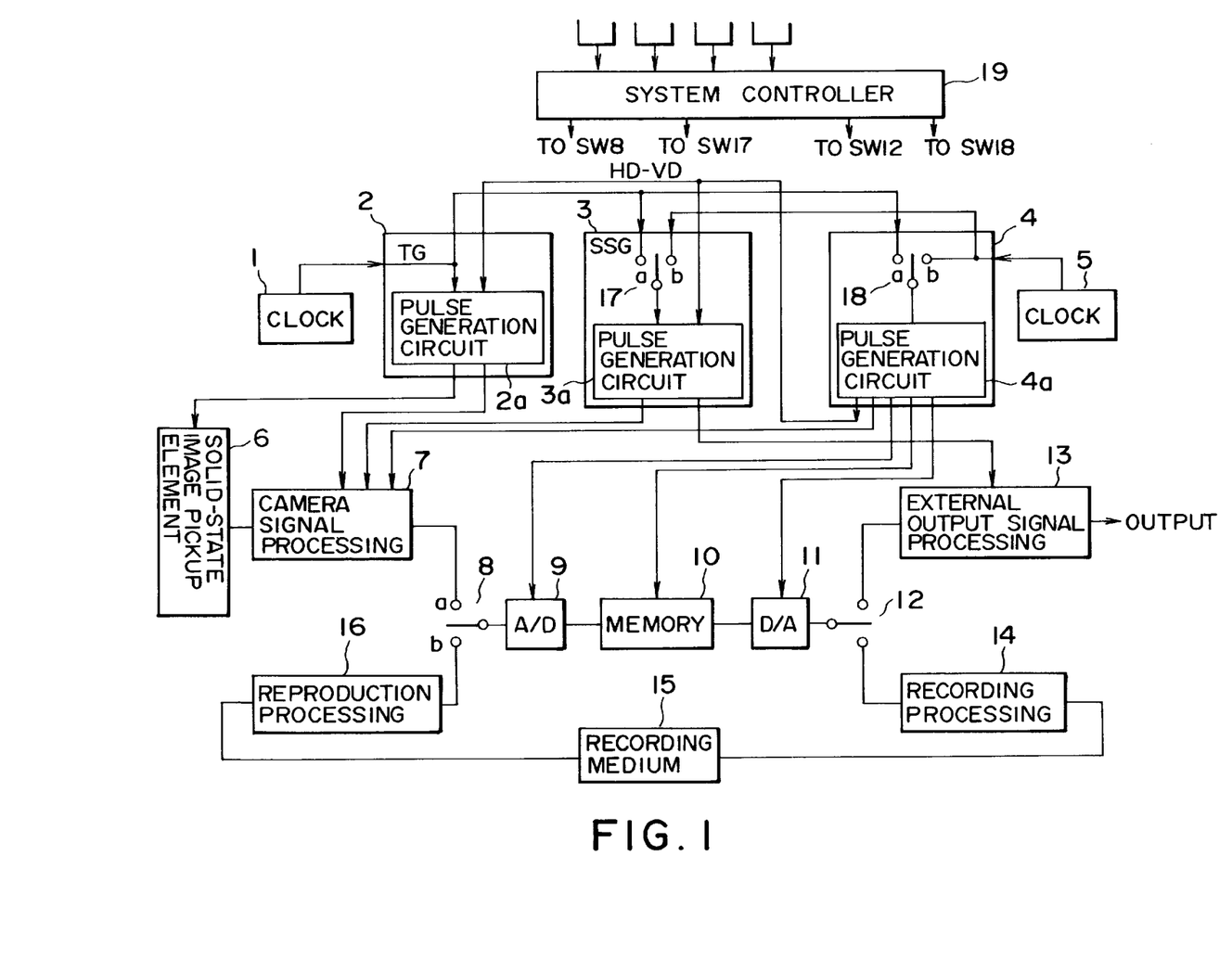
FIG. 1 is a block diagram showing an embodiment of the present invention.

FIG. 1 is a block diagram showing an image pickup apparatus according to one embodiment of the present invention.

In FIG. 1, 1 is a clock pulse generation circuit useful to generate the clock pulse having a predetermined clock pulse, when a solid-state image pickup element 6 is operating. 2 is a timing generator (hereinafter abbreviated TG) for generating the pulse necessary for a camera signal processing circuit 7, having a pulse generation circuit 2a inside thereof. 3 is a signal generator (hereinafter abbreviated SSG) for generating the pulse necessary for each portion of the image pickup device in this embodiment, having a change-over switch 17 and a pulse generation circuit 3a. The change-over switch 17 is a switch for changing selectively the clock pulse from one of the clock pulse generation circuits 1, 5 to the other, in which the pulse generation circuit 3a generates the pulse based on the clock pulse selected. 4 is a memory controller for controlling the memory 101, having a change-over switch 180 and a pulse generation circuit 4a inside thereof. The change-over switch 180 is a switch for changing the clock pulse from one of the clock pulse generation circuits 1, 5 to the other, in the same way as previously described, in which the pulse generation circuit 4a generates the pulse based on the clock pulse set by the change-over switch 18.

5 is a clock pulse generation circuit useful to generate the clock pulse having a predetermined frequency, when the solid-state image pickup element 6 is not operating. 6 is a solid-state image pickup element consisting of a CCD image sensor, 7 is a camera signal processing circuit for processing a signal read from the solid-state image pickup element 6 into a predetermined signal format, 8 is a switch for switching between the camera signal processing circuit 7 and a reproduction processing circuit 160 as will be described later, and 9 is an A/D converter for converting an input signal from the circuit switched by the switch 8 into the digital signal. 101 is a memory for storing a video signal, 11 is a D/A converter for converting the digital signal into the analog signal when reading the video signal stored in the memory 101, and 120 is a switch for connecting the output of the D/A converter 11 to an external output signal processing circuit 13 or a recording processing circuit 140. The external output signal processing circuit 13 is a circuit for processing the video signal into a predetermined signal format when outputting it to the outside, and the recording processing circuit 140 is a circuit for processing the video signal into a predetermined signal format when recording it on a recording medium 15. 160 is a reproduction processing circuit for processing the reproduction signal into a predetermined signal format when reproducing the signal stored in the recording medium 15. 19 is a system controller for controlling the change-over of the switches 8, 120, 17 and 180, as above described, appropriately in accordance with the operation of an operation key 200.

The operation of this embodiment will be described below. First, when the photographing is made with the solid-state image pickup element 6, the switch 8 is connected to the a side. An image pixel signal of the solid-state image pickup element 6 is converted into the digital signal by the A/D converter 9, after being subjected to a predetermined process of the camera signal processing circuit 7, and stored in the memory 101. In this case, TG 2 generates the driving pulse of the solid-state image pickup element 6 and the signal processing pulse, based on the clock pulse generated by the clock pulse generation circuit 1, which are then output into the solid-state image pickup element 6 and the camera signal processing circuit 7, respectively. Accordingly, the solid-state image pickup element 6 and the camera signal processing circuit 7 are driven by the pulse signal generated in the pulse generation circuit 2a based on the clock pulse generated in the clock pulse generation circuit 1. In photographing, the switches 17 and 180 provided inside the SSG 3 and the memory controller 4 are switched to the respective a sides. Thus, the pulse generation circuits in the SSG 3 and the memory controller 4 generate respective pulses, based on the clock pulse of the clock pulse generation circuit 1, which are then sent out to related portions. Accordingly, when the solid-state image pickup element 6 is operating, all the processing is performed based on the clock pulse generated in the clock pulse generation circuit 1.

On the other hand, when the switch 8 is changed to the b side, or when by reading out the signal stored in the memory 101, the video signal is output to the outside, or the signal is recorded on the recording medium 15, the switches 17 and 180 in the SSG 3 and the memory controller 4 are connected to the respective b sides. Thus, the pulse generation circuits of the SSG 3 and the memory controller 4 generate respective pulses based on the clock pulse generated in the clock pulse generation circuit 5 and output them to related portions. Accordingly, when the solid-state image pickup element 6 is not operating, all the processing is performed based on the clock pulse generated in the clock puse generation circuit 5.

Thus, in this embodiment, there are separately provided the clock pulse generation circuit 1 to be used when the solid-state image pickup element 6 is operating and the clock pulse generation circuit 5 to be used when it is not operating, in which when the solid-state image pickup element 6 is operating, the dedicated clock pulse is used for the processing of each portion, so that the modulation of the clock can be avoided.

As above described, according to this embodiment, it is possible to resolve a conventional problem that the clock may be modulated, and there is an effect that it is possible to suppress the noise component of the video signal and prevent the degradation in the resolution of image.

Another embodiment of the present invention will be described below.

Figure 2:
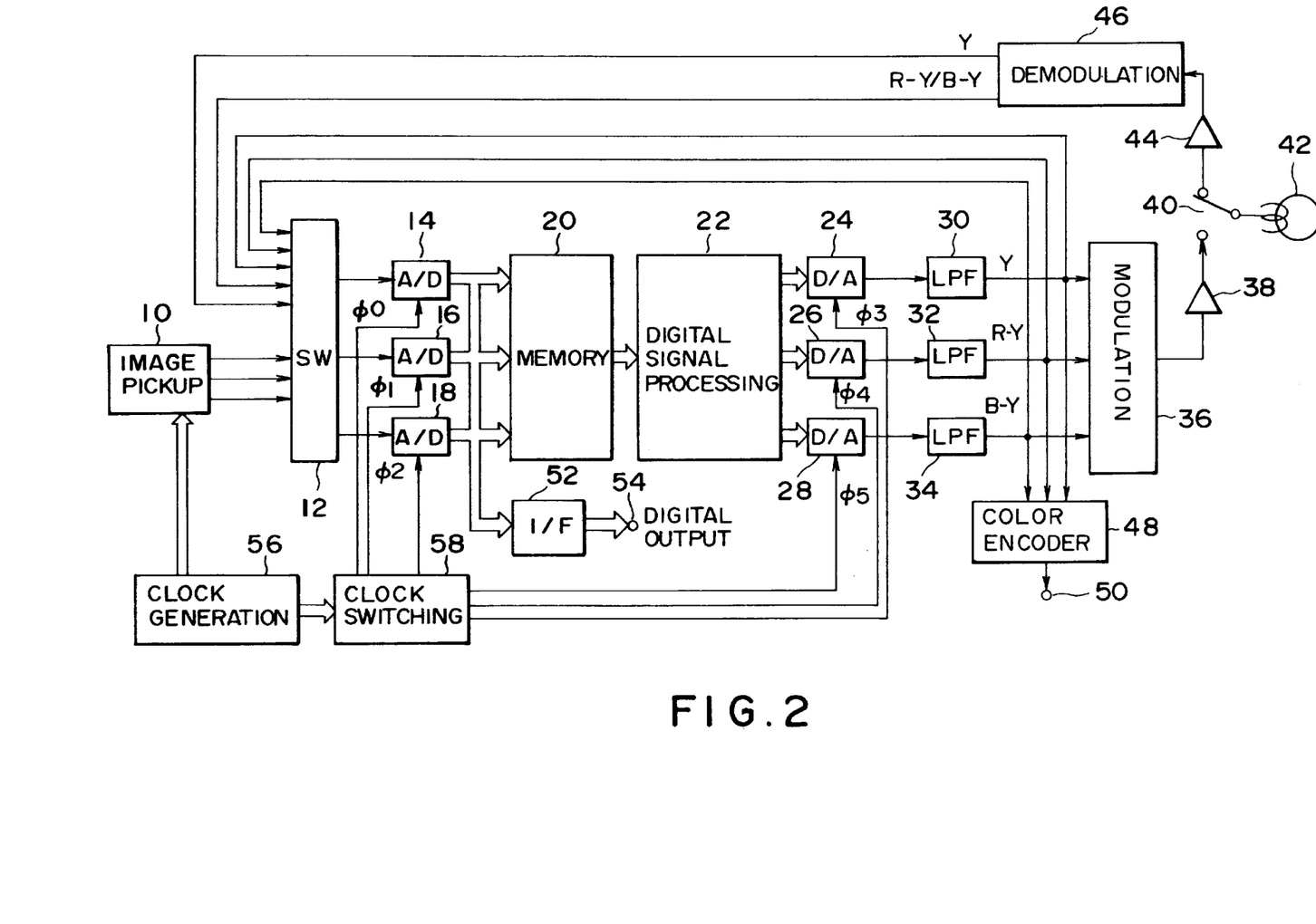
FIG. 2 is a block diagram showing another embodiment of the present invention.

FIG. 2 is a configuration block diagram of another embodiment of the present invention. In FIG. 2, 10 is an image pickup element for making the photoelectric conversion of an object image and outputting an RGB image signal, 12 is an analog switch, 14, 16, 18 are A/D converters for converting an analog signal from the analog switch 12 into the digital signal, 20 is a memory having the memory capacity as large as at least one picture, 22 is a digital signal processing circuit for making the gamma correction, the conversion into a luminance/color difference signal, the addition of a synchronizing signal and the aperture compensation, for an output signal of the image pickup element 10, and the line coincidence of a color difference line sequential signal, the drop-out compensation and the interlace, for a reproduced signal from the recording medium, whereby this circuit outputs a luminance signal Y and two color difference signals R-Y, B-Y, irrespective of the input signal format. 24, 26, 28 are D/A converters for converting three digital outputs of the digital signal processing circuit 22 into respective analog signals, and 30, 32, 34 are low pass filters (LPF) for limiting the band for the outputs of the D/A converters 24, 26, 28.

36 is a modulation circuit for FM modulating the outputs of the LPFs 30, 32, 34 to the frequency band appropriate for recording onto a recording medium such as a magnetic disk, 38 is a recording amplifier, 40 is a change-over switch for switching between the recording and the reproduction, and 42 is a magnetic head. 44 is a reproduction amplifier for amplifying the reproduced output of the magnetic head 42, and 46 is a demodulation circuit for demodulating the output of the reproduction amplifier 44.

48 is a color encoder for generating a composite video signal in the standard format from the outputs of the LPFs 30, 32, 34, i.e., a luminance signal Y and color difference signals R-Y, B-Y, the generated composite video signal being output from an output terminal 50 to the outside. 52 is an interface for outputting the digital signals of the A/D converters 14, 16, 18 to the outside, and 54 is a digital output terminal for the connection to the external apparatus. The interface 52 comprises a compression circuit or an error detection/correction encoding circuit, if necessary.

56 is a clock generation circuit for generating the clock having a frequency necessary for the image pickup element 10, the A/D converters 14, 16, 18 and the D/A converters 24, 26, 28, and 58 is a clock switching circuit for switching the frequencies of sampling clocks ø0, ø1, ø2, ø3, ø4, ø5 supplied from the clock generation circuit 56 to the A/D converters 14, 16, 18 and the D/A converters 24, 26, 28, in accordance with operation mode.

In this embodiment, the analog switch 12 allows for the selection of the output (RGB) of the image pickup element 10, the output (luminance signal Y and line sequential color difference signals R-Y/B-Y) of the demodulation circuit 46, or the output (luminance signal Y and color difference signals R-Y/B-Y) of the LPFs 30, 32, 34.

Figure 3:
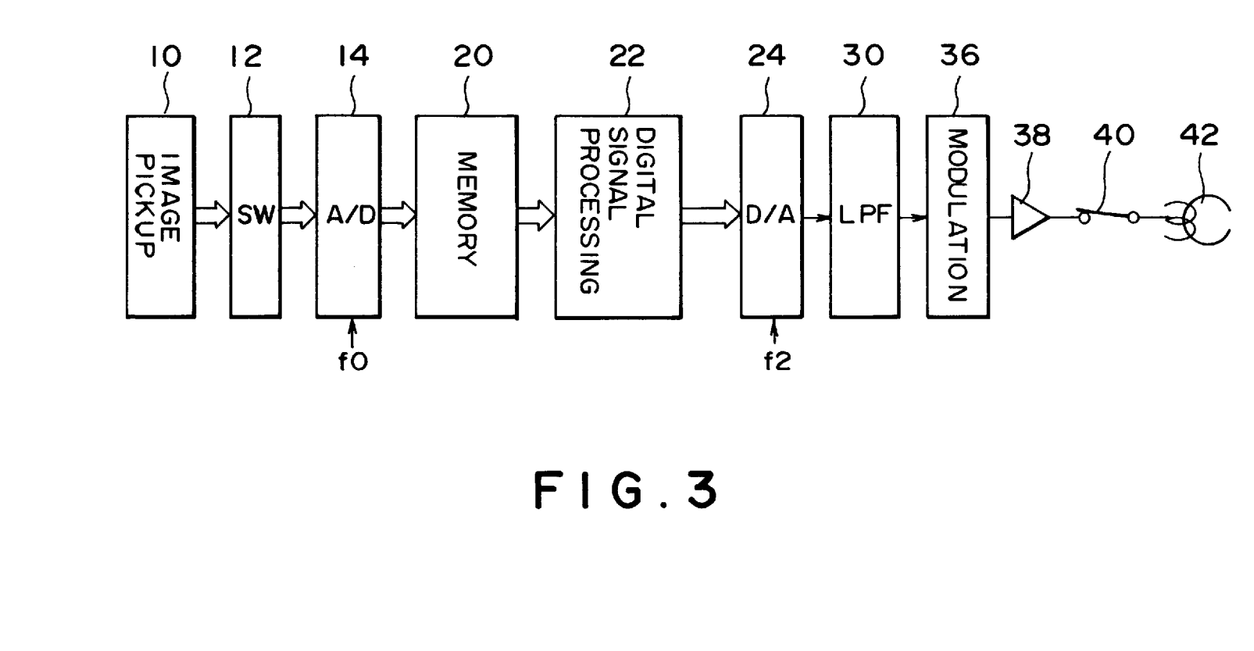
FIG. 3 is a block diagram showing the configuration for the signal path in a recording mode in the embodiment as showin in FIG. 2.
Figure 4:
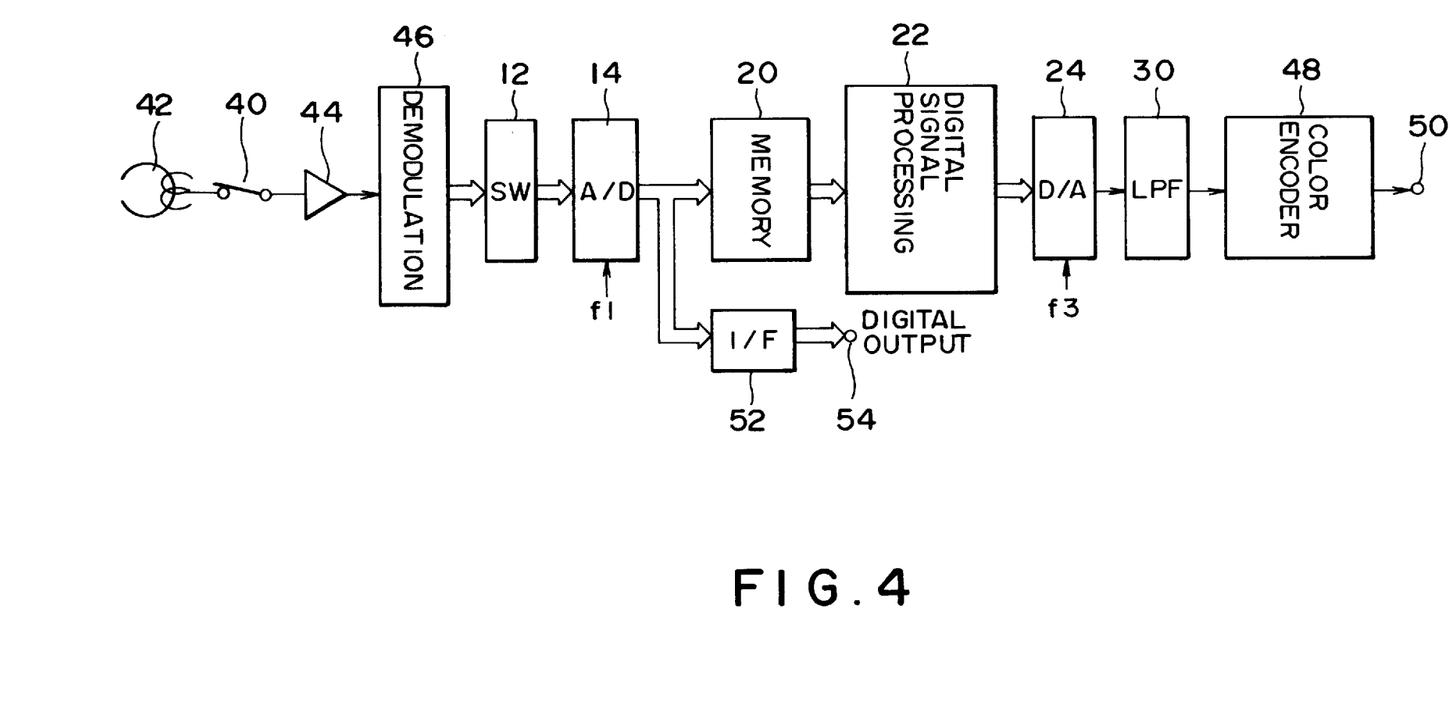
FIG. 4 is a block diagram showing the configuration for the signal path in a reproduction output more in the embodiment as shown in FIG. 2.
Figure 5:
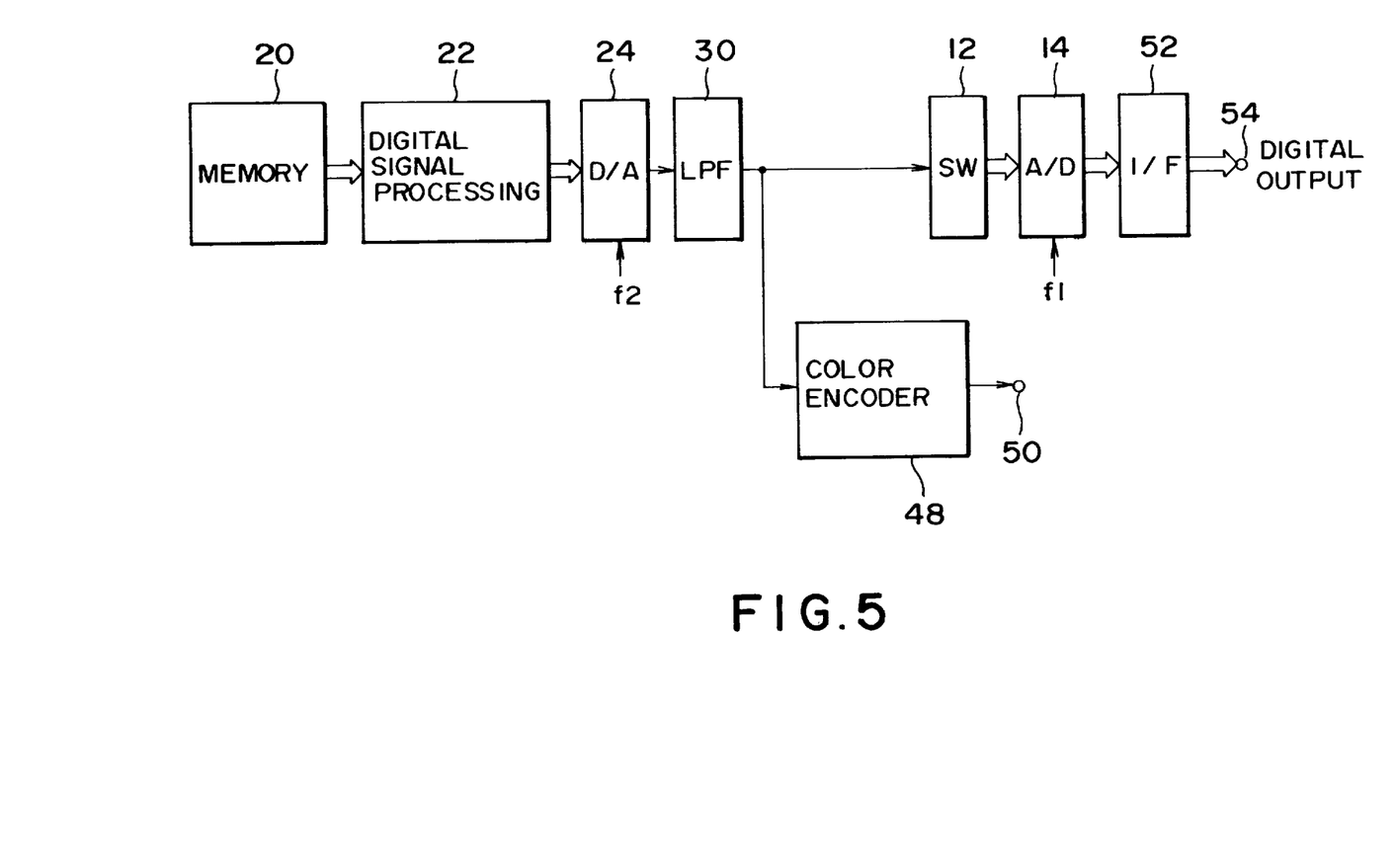
FIG. 5 is a block diagram showing the configuration for the signal path in a still picture output mode in the embodiment as shown in FIG. 2.

In this embodiment, a recording mode for recording a photographed image with the image pickup element 10 onto a recording medium, not shown, a reproduction output mode for outputting a reproduced image from the recording medium, not shown, in the composite or digital output form, and a still picture output mode for outputting an image (a photographed image with the image pickup element 10 or a still picture reproduced from the recording medium) stored in the memory 20 in the composite or digital output form are provided, and the block diagram reconfigured from the block diagram of FIG. 2 in accordance with the flow of the luminance signal in each mode is shown in FIGS. 3, 4 and 5.

Referring to FIGS. 2 and 3, the recording mode will be first described. In the recording mode, the analog switch 12 selects the RGB output of the image pickup element 10 and applies it to the A/D converters 14, 16, 18. The clock switching circuit 58 supplies the sampling clocks ø0, ø1, ø2 having a frequency f0 appropriate for sampling the output of the image pickup element 10 to the A/D converters 14, 16, 18, respectively, and supplies the sampling clocks ø3, ø4, ø5 having a frequency f1 corresponding to the sampling frequency f0 in the A/D converters 14, 16, 18 to the D/A converters 24, 26, 28, respectively. A switch 40 is connected to the side of the recording amplifier 38.

The RGB image signal of an object image with the image pickup element 10 is applied via the analog switch 12 to the A/D converters 14, 16, 18. The RGB signal digitized by the A/D converters 14, 16, 18 is stored in the memory 20, and the digital signal processing circuit 22 makes the gamma correction, the conversion into the luminance/color difference signal, the addition of a synchronizing signal, and the aperture compensation for the image data on the memory 20, and outputs an image signal in the form of a luminance signal Y and color difference signals R-Y, B-Y, in which the D/A converters 24, 26, 28 convert the luminance signal Y and the color difference signals R-Y and B-Y into analog signals.

The outputs of the D/A converters 24, 26, 28 are limited in a certain band by the LPFs 30, 32, 34, and applied to the modulation circuit 36 to modulate them. The output of the modulation circuit 36 is applied via the recording amplifier and the switch 40 to the magnetic head, and recorded on a recording medium, not shown. The outputs of the LPFs 30, 32, 34 are also applied to a color encoder 48, converted into a composite video signal, and supplied via a video output terminal 50 to an external monitor. Thus, a photographed image to be recorded can be confirmed visually.

Referring to FIGS. 2 and 4, the reproduction output mode will be described below. In a reproduction output mode, the analog switch 12 selects the output of the demodulation circuit 46 to be applied to the A/D converters 14, 16, 18. The clock switching circuit 58 supplies the sampling clocks ø0, ø1, ø2 having a frequency f1, with the aspect ratio of pixel being 1 to 1, to the A/D converters 14, 16, 18, and supplies the sampling clocks 53, 54, 55 having a frequency f3 for converting an image data sampled at a sampling frequency f1 in the A/D converters 14, 16, 18 into analog component signal to the D/A converters 24, 26, 28. The switch 40 is connected to the side of the reproduction amplifier 44.

The output of the magnetic head 42 is applied via the switch 40 and the reproduction amplifier 44 to the demodulation circuit 46. The demodulation circuit 46 outputs a reproduction image signal in the form of the luminance signal Y and the line sequential color difference signal R-Y/B-Y, and the analog switch 12 applies two output signals of the demodulation circuit 46 to, for example, the A/D converters 14, 16. The A/D converters 14, 16 sample and digitize the output of the demodulation circuit 46 at a sampling frequency, with the aspect ratio of pixel being 1 to 1, and writes the output data in the memory 20, which data is output via an interface 52 to a digital output terminal 54. Thus, the digital luminance signal Y and the digital line sequential color difference signal R-Y/B-Y, with the aspect ratio of pixel being 1 to 1, can be obtained via the digital output terminal 54.

The digital signal processing circuit 22 makes the line coincidence of the color difference line sequential signal, the drop out compensation, and the interlace for reproduced image data stored in the memory 20, and outputs the digital luminance signal Y and the digital color difference signals R-Y, B-Y of the line coincidence. The D/A converters 24, 26, 28 convert the outputs of the digital signal processing circuit 22 into analog signals at the same clock frequency as the sampling frequency of the A/D converters 14, 16, which signals are limited in certain bands by the LPFs 30, 32, 34, respectively, converted into a composite video signal by the color encoder 48 and output via a composite output terminal 50.

Referring to FIGS. 2 and 5, a still picture output mode for outputting the image stored in the memory 20 will be described below. In this mode, the analog switch 12 selects the output of the LPFs 30, 32, 34 to be applied to the A/D converters 14, 16, 18. The clock switching circuit 58 supplies the sampling clocks ø0, ø1, ø2 having a frequency f1 to the A/D converters 14, 16, 18, and supplies the sampling clocks ø3, ø4, ø5 having a frequency f2 to the D/A converters 24, 26, 28.

The image data stored in the memory 20 is read and applied as the luminance signal Y and the color difference signals R-Y and B-Y through the digital signal processing circuit 22 to the D/A converters 24, 26, 28. The D/A converters 24, 26, 28 convert the luminance signal Y, the color difference signal R-Y and the color difference signal B-Y into analog signal.

The outputs of the D/A converters 24, 26, 28 are limited in certain bands by the LPFs 30, 32, 34, converted into a composite video signal by the color encoder 48, and supplied via the video output terminal 50 to an external monitor. Thus, the composite video signal for an image stored in memory 20 can be obtained.

The outputs of the LPFs 30, 32, 34 are also applied via the analog switch 12 to the A/D converters 14, 16, 18. Since the sampling frequency of the A/D converters 14, 16, 18 is set at a frequency f1, with the aspect ratio of pixel being 1 to 1, the image data output from the A/D converters 14, 16, 18 have an aspect ratio of pixel of 1 to 1. The interface 52 outputs the output data of the A/D converters 14, 16, 18 to the digital output terminal 54.

When the digital data is output to an external apparatus such as a printer, the following action must be taken in the reproduction output mode and the still picture output mode. For example, when the aspect ratio of pixel for the digital output is desired to have 2 to 3, in the reproduction output mode for obtaining the digital output representing the color component in the form of color difference line sequential signal, the frequencies of the sampling clocks for the A/D converters 14, 16, 18 and the D/A converters 24, 26, 28 must be two-thirds of f1 and f3, respectively. Also, in the still picture output mode for obtaining the digital output representing the color component in the form of color difference signal of the line coincidence, the frequency of the sampling clocks for the D/A converters 24, 26, 28 remains f2, and the frequency of the sampling clocks for the A/D converters 14, 16, 18 must be two-thirds of f1.

In the above embodiment, the image pickup element 10 outputs an image signal in the RGB format, but it will be appreciated that the image signal can be output in complementary colors or other combination. When the digital signal processing is not required by the digital signal processing circuit 22, the signal will bypass or simply pass through the digital signal processing circuit 22.

The output from the digital interface is in the form of Y, R-Y and B-Y in the above described embodiment, but it will be appreciated that it may be in other form such as RGB.

As can be easily understood from the above description, the present invention can provide the output of a digital image having a desired sampling rate or aspect ratio without the addition of A/D converting means.

That is, for example, when the image is dealt with by the computer, the aspect ratio of pixel is often 1 to 1, so that when a photographed image is transferred to the computer, it is preferable to output the digital data at an aspect ratio of 1 to 1. Also, when a hard copy is made with the printer, it is desirable to output the digital data at an aspect ratio of pixel in accordance with a dot pitch of the printer.

However, in a conventional case, if the digital data output is attempted before a photographed image is recorded on a recording medium, the aspect ratio of pixel for the digital output is a fixed value corresponding to the aspect ratio of pixel in an image pickup element for use, whereby it is necessary to change the aspect ratio of pixel on the side of a computer or printer, causing a problem with the connectability to the computer or the processing load for changing the aspect ratio.

On the contrary, in this embodiment, it is possible to pick up the image data at a desired sampling rate or aspect ratio via digital interface means because of the ability of selecting freely the sampling clock frequencies for the A/D converting means and the D/A converting means, as well as providing the digital output of reproduced image data at a desired sampling rate or aspect ratio through an image reproduction device which passes the reproduced image signal into the selecting means.

What is claimed is:

1. An image pickup apparatus comprising:
   (a) signal processing means having an image pickup means and memory means for storing an output of the image pickup means;
   (b) first and second clock pulse generation means for generating a clock pulse;
   (c) switching means for supplying selectively an output of said first clock pulse generation means or said second clock pulse generation means to said signal processing means; and
   (d) control means for controlling the switching of said switching means in accordance with whether said signal processing means operates in a first mode in which said image pickup means and said memory means are driven or a second mode in which said memory means is driven.

2. An image pickup apparatus according to claim 1, wherein in said second mode a signal stored in said memory means is read out.

3. An image pickup apparatus according to claim 2, further comprising recording means for recording a signal read out from said memory means on a recording medium.

4. An image pickup apparatus according to claim 1, wherein in said second mode said memory means stores a signal.

5. An image pickup apparatus according to claim 4, further comprising reproduction means for reproducing a signal recorded on a recording medium.

6. An image pickup apparatus comprising:
   (a) image pickup means for picking up an image of an object and outputting an image pickup signal;
   (b) signal processing means for performing a predetermined processing on the image pickup signal output from said image pickup means and outputting a processed signal;
   (c) first clock pulse supplying means for supplying a first pulse to said signal processing means;
   (d) second clock pulse supplying means for supplying a second pulse to said signal processing means; and
   (e) control means for controlling said first clock pulse supplying means to operate when said image pickup means operates and controlling said second clock pulse supplying means to operate when said image pickup means does not operate.

7. An image pickup apparatus according to claim 6, further comprising memory means for storing an output of said image pickup means, wherein said signal processing means processes an output of said image pickup means or said memory means.

8. An image pickup apparatus comprising:
   (a) image pickup mean for picking up an image of an object and outputting an image pickup signal;
   (b) signal processing means for performing a predetermined processing on the image pickup signal output from said image pickup means and outputting a processed signal;
   (c) clock pulse generation means for generating a first clock pulse and a second clock pulse;
   (d) supplying means for supplying selectively said first clock pulse or said second clock pulse to said signal processing means; and
   (e) control means for controlling said supplying means to supply said first clock pulse in a first mode in which said image pickup means is driven or to supply said second clock pulse in a second mode in which said image pickup means is not driven.

9. An image pickup apparatus according to claim 8, wherein said supplying means comprises separate first supplying means for supplying said first clock pulse and second supplying means for supplying said second clock pulse.

10. An image pickup apparatus according to claim 9, further comprising memory means for storing an output of said image pickup means, wherein said signal processing means processes an output of said image pickup means or said memory means.

11. An image pickup apparatus according to claim 8, further comprising memory means for storing an output of said image pickup means, wherein said signal processing means processes an output of said image pickup means or said memory means.

12. An image pickup apparatus according to claim 8, further comprising memory means for storing an output of said image pickup means, wherein said signal processing means processes an output of said image pickup means or said memory means.

* * * * *

UNITED STATES PATENT AND TRADEMARK OFFICE
CERTIFICATE OF CORRECTION

PATENT NO. : 5,825,511
DATED : October 20, 1998
INVENTOR(S) : MASAHI HORI ET AL.

It is certified that error appears in the above-identified patent and that said Letters Patent is hereby corrected as shown below:

<u>ON COVER PAGE, AT [75] INVENTORS</u>

"Saburo Nakazato, Yokohama; Izuro Horiuchi, Machida," should be deleted.

<u>COLUMN 6</u>

Line 19, "signal." should read --signals.--;
Line 39, "have" should read --be--.

<u>COLUMN 8</u>

Line 18, "mean" should read --means--.

Signed and Sealed this

Twenty-fourth Day of October, 2000

Attest:

Q. TODD DICKINSON

*Attesting Officer*     *Director of Patents and Trademarks*